United States Patent [19]

Kürti et al.

[11] Patent Number: 4,949,075

[45] Date of Patent: Aug. 14, 1990

[54] PORTABLE OPTICAL ALARM SYSTEM FOR AREA PROTECTION

[75] Inventors: László Kürti; Péter Hakkel; Gyula Tóth; Gyõzo Vasziljevics, all of Budapest, Hungary

[73] Assignees: Magyar Optikai Muvek; Komplex Kulkereskedelmi Vallalat, both of Hungary

[21] Appl. No.: 199,039

[22] PCT Filed: Sep. 15, 1987

[86] PCT No.: PCT/HU87/00039

§ 371 Date: Jul. 13, 1988

§ 102(e) Date: Jul. 13, 1988

[87] PCT Pub. No.: WO88/02159

PCT Pub. Date: Mar. 24, 1988

[30] Foreign Application Priority Data

Sep. 15, 1986 [HU] Hungary .............................. 3935/86

[51] Int. Cl.[5] .................................................. G01T 1/16

[52] U.S. Cl. ...................................... 340/555; 340/556

[58] Field of Search ...................... 340/309.1, 323, 555, 340/556, 557, 539; 356/3, 18; 272/4, 5, 100, 103, DIG. 5; 250/221

[56] References Cited

U.S. PATENT DOCUMENTS

| | | | |
|---|---|---|---|
| 3,742,222 | 6/1973 | Endl | 340/556 |
| 4,186,388 | 1/1980 | Robinson | 340/556 |
| 4,250,498 | 2/1981 | Walter | 340/556 |
| 4,314,239 | 2/1982 | Odone | 340/556 |

*Primary Examiner*—Michael J. Tokar
*Attorney, Agent, or Firm*—Handal & Morofsky

[57] ABSTRACT

A portable optical alarm system for area protection containing at least one light-emitting transmitter and a receiver sensing the emitted light is disclosed. The transmitters and receivers of the system form a chain in such a manner that the receiver sensing the light-impulses of the first transmitter is always connected electrically to the following transmitter and the last receiver of the system is connected electrically to the intervening organ and partly to the first transmitter of the system, or the first transmitter of the system is formed as a free-running unit. Transmitters and receivers can be arranged in an optical mutual arrangement where they are arranged in a casing containing the transmitter circuit and the associated battery along with the receiver circuit and the battery belonging thereto.

14 Claims, 4 Drawing Sheets

PORTABLE OPTICAL ALARM SYSTEM FOR AREA PROTECTION

FIELD OF THE INVENTION

The invention relates to a portable optical alarm system for area protection containing at least one transmitter emitting a light beam and a receiver sensing the emitted light, as well as a driving stage connected to the output of one of the receiver. The alarm system for area protection can be preferably used everywhere, where a protecting-alarming system is to be established for the sake of property protection or for safety technical reasons in a very short time, with a periodical character or under frequently changing circumstances and unobserved.

BACKGROUND OF THE INVENTION

In practice a plurality of optical alarm systems for area protection have been known and used, the common characteristic of which lies in that in the majority of the cases infrared light is used in the established light barriers. Said light barriers radiate modulated or unmodulated light in a continuous mode of operation, accordingly, transmitters and receivers of the light barriers require power of such a magnitude, which cannot be supplied economically either from a battery. For this reason the required number of transmitters and receivers of the light barriers are arranged in a stationary way, simultaneously power is provided for, representing—as widely known—the weak point of the protection systems.

Due to the aforemention features known optical alarm systems for area protection are not at all suitable for a changeable settlement or as portable embodiments, not in the least degree for battery operation, although there is an ever increasing demand in this respect.

SUMMARY OF THE INVENTION

The aim of the invention is to develop a portable optical alarm system for area protection, by the aid of which partly the deficiencies of known protection systems can be eliminated, partly it becomes possible to protect an area of optional magnitude, shape and extension fully automatized without any observance of the system; a further requirement lies in that neither settlement nor disassembly, translocation should require special expertness, expenditure on material and live labour, energy supply should not require the laying of cables.

A further aim of the invention lies in that the system should give an alarm signal in case of voltage dropout or in case of any intervention of sabotage character; it is also required that the driving stage having been connected to the last receiver of the system should be able to actuate any optional intervening organ and to perform remote actuation.

The invention is based on the recognition in so far as energy consumption of the known optical alarm systems for area protection is not exclusively determined by the electronic components applied in the transmitting and receiving circuits, respectively, but the complexity of circuits is playing a significant role in consumption; further factors influencing consumption are the number of independent circuits for performing the most diverse functions, energy distribution of the radiated light output as well as energy requirement of the actuation of the intervening organ connected to the system. Accordingly, the task lies in to develop a transmitting circuit and a receiving circuit, which are able to perform the functions needed with a low number of elements, by using circuit arrangements with a combined function and so, that dissipated loss output could be kept permanently on the possibly lowest value; a further requirement lies in that the emitted light pulses resp. output pulses should not appear in form of sudden and considerable capacities in the supply of the circuits.

The task set was solved by the aid of an optical alarm system for area protection which contains at least one transmitter emitting a light beam and a receiver sensing the emitted light, furtheron it is provided with a driving stage connected to the output of one of the receivers. Said arrangement is developed in so far as each transmitter and receiver are arranged in a casing containing the pulse-mode transmitter or receiver circuit with a battery and the output of each receiver is connected to the input of the following transmitter staying therewith in an electrical connection, while one transmitter of the system is provided with a setting element activating an input of the transmitter, while the output of the receiver forming the last member of the system is connected to the input of the driving stage.

With a preferred embodiment of the optical alarm system for area protection the transmitting circuit of the transmitter contains an astable multivibrator, a timer, a logic circuit, an output switching circuit, infrared radiation source, energy storing device and constant-current source, wherein an enabling input of the transmitter circuit is connected to one of the inputs of a NAND gate of the logic circuit while an integrator of the timer is connected to the other input of the NAND gate and the output of the latter one is connected to a driving input of the astable multivibrator, the output of which is connected via a transistor output switching circuit to one of the terminals of a light-emitting diode inserted as the infrared radiation source, while the other terminal thereof if connected to the condenser as the energy storing device and charged by means of a constant-current source.

With a further preferred embodiment of the optical alarm system for area protection according to the invention the receiver circuit of the receiver contains a light sensor, a wide-band, high-gain amplifier connected thereto, an impulse drop-out detector formed as an integrator and connected to the output of the amplifier, and output RS flip-flop and a transistor driving stage connected thereto.

In sense of the invention it is considered as advantageous, if the transmitter circuit and the receiver circuit are connected to the belonging battery through a voltage stabilizer and it is also considered as advantageous, if the transmitter circuit and the receiver circuit are connected through the voltage stabilizer to solar elements connected parallel with the battery.

The main advantage of the optical alarm system for area protection according to the invention lies in that due to the battery or accumulator powering it can be arranged absolutely freely, in any optional distribution and without the necessity of any observance. Due to the design of the transmitters and receivers of the system a fully closed loop can be formed, and owing to the simple layout of the transmitter circuits and the receiver circuits, respectively, said circuits can be reduced to an extremly small size, thus their establishment can be facilitated. Due to the design of the receiver circuit and the transmitter circuit the standby power dissipation of the circuits is of neglible extent, at the same time operating power dissipation does not burden in an impulse-like manner the energy source delivering expediently the stabilized supply voltage. The central wiring between the single transmitters and receivers becomes also superfluous, as the stations are mutually starting one another and forward the change occuring in any point of the system.

BRIEF DESCRIPTION OF THE DRAWINGS

The invention will be described in detail by the aid of the drawings enclosed, wherein a preferable embodiment of the portable optical alarm system for area protection according to the invention is illustrated.

Description of the preferred embodiment FIG. 1 illustrates a block diagram of a receiver of the portable optical alarm system according to the invention, serving as an example. The output of a light sensor 1 is connected to an input of an amplifier 2, the output of which is connected to an impulse-drop-out detector 3. The impulse drop-out detector 3 is led to an output register 4, which again is connected to an input of a driver stage 5. Battery 6 supplying powering the receiver—as illustrated here—is connected through a voltage stabilizer 7 to the corresponding points of the light sensor 1, the amplifier 2, the impulse drop-out detector 3, the output register 4 and the driver stage 5. An enabling output **5*b* of the driver stage 5 is connected to an enabling input 8*a* of a logic circuit 8 of a transmitter, as illustrated in the block diagram in FIG. 2. The output of the logic circuit 8 is connected to the driving input of an astable multivibrator 9 and an output 9*a* thereof is connected to a further enabling input 8*b* of the logic circuit 8 through a timer 10, while an other output 9*b* is connected to the input of an output switching circuit 11. The output switching circuit 11 is connected to one of the terminals of a radiation source 12/infrared light emitting diode/-while its other terminal is connected to the energy storing device 14 which again is connected to a constant-current source 13**.

Figure 1:
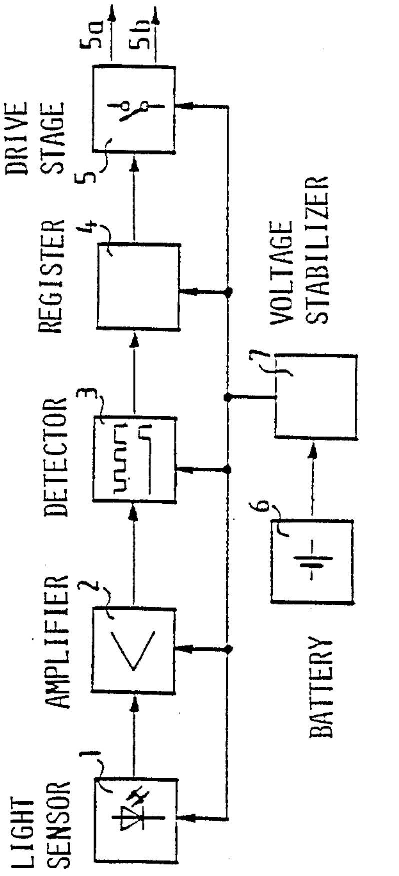
FIG. 1 is a block diagram of the receiver circuit of a possible embodiment of the portable optical alarm system for area protection according to the invention, FIG. 2 illustrated the block diagram of the transmitter circuit belonging to the receiver circuit according to FIG. 1, FIG. 3 gives a more detailed diagram of the receiver circuit according to FIG. 1.
Figure 2:
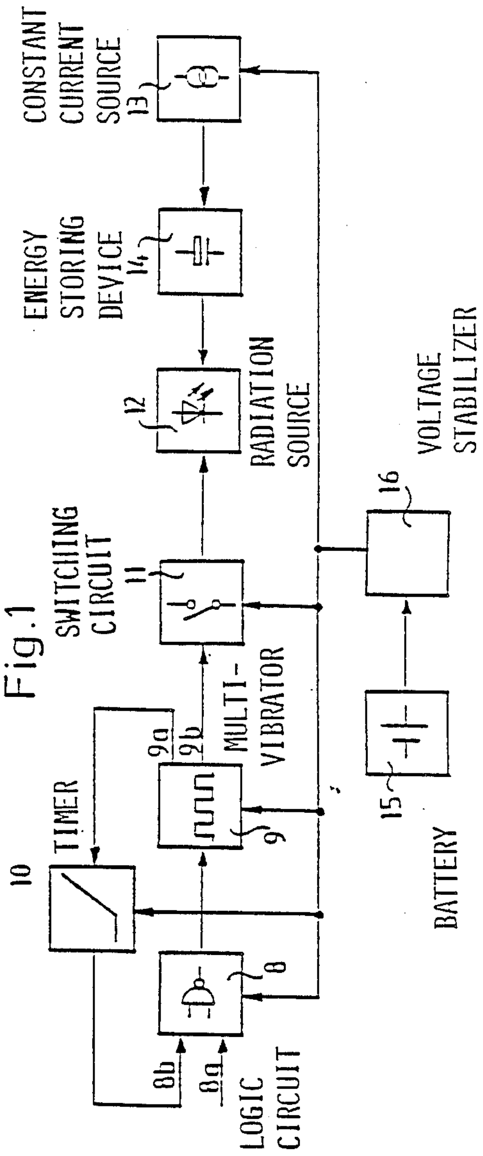

A battery 15 powering the transmitter is connected via voltage stabilizer 16—having the same layout as the voltage stabilizer 7—to the complying voltage supply points of the logic circuit 8, the astable multivibrator 9, the timer 10, the output switching circuit 11 and the constant-current source 13.

Figure 3:
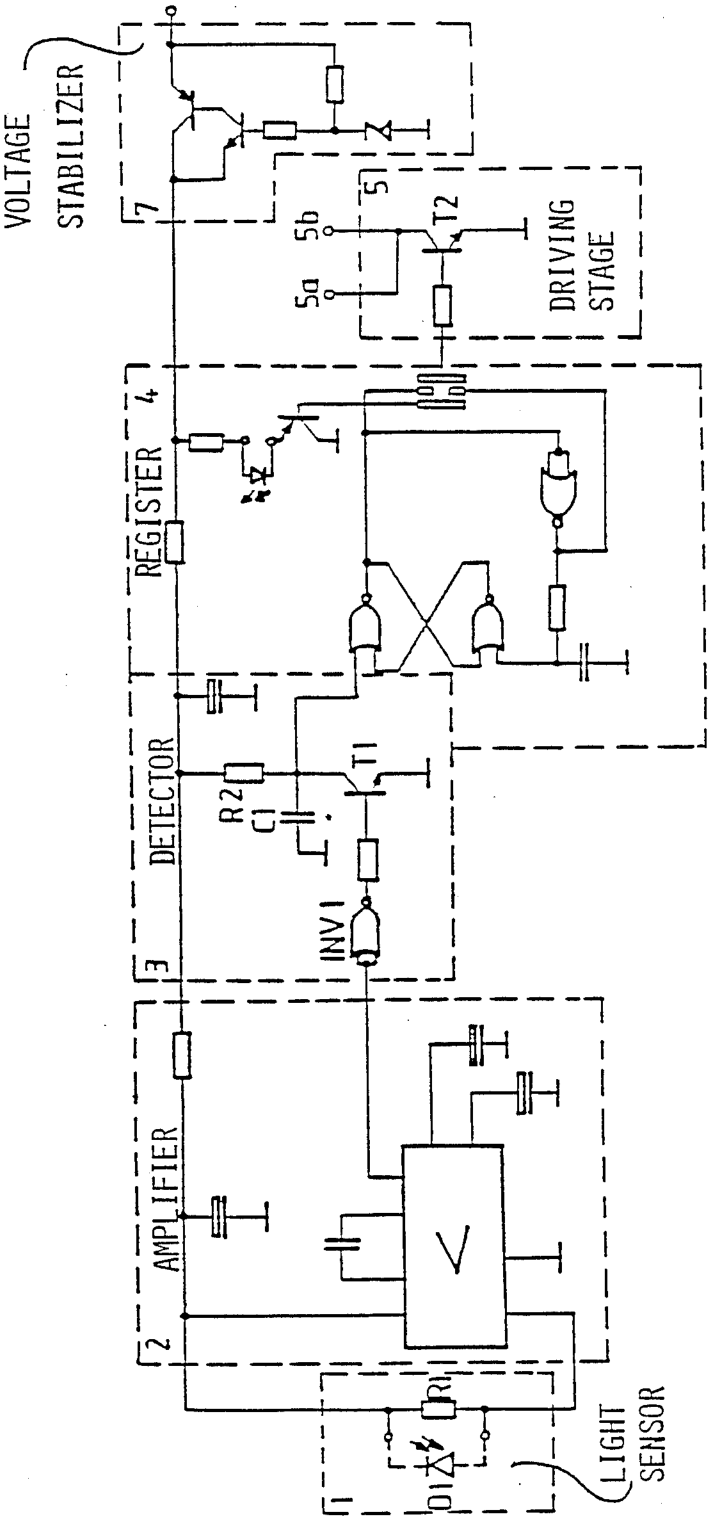

Operation of the portable optical alarm system for area protection according to the invention will be described by the aid of the more detailed circuit diagrams, as to be seen in FIGS. 3 and 4. Under the influence of the infrared light beam falling onto the photodiode D1 of the light sensor 1 the photodiode D1 shunts the resistor R1 connected parallel therewith, the considerable voltage change thus produced is forwarded by the output of the integrated circuit amplifier 2 with a sensitivity of about 1 $\mu$V and automatic controlled gain of about 60 dB. Output signal of the amplifier 2 arrives through an inverter INV 1 to the base of a transistor T1, which discharges a condenser C1 charged via resistor R2 in compliance with the rate of the infrared light beam arriving periodically onto the photodiode D1. Time constant of the resistor R2 and the condenser C1 is chosen so, that in case of regularly arriving light impulses the condenser C1 cannot be charged to a voltage level which could trigger the R-S flip-flop of the output register 4 built-up of NAND gates. If for any reason an adequate light impulse does not arrive at the photodiode D1, the amplifier 2 is not able to provide a voltage to transistor's T1 base causing it to conduct. As a consequence, increasing voltage on the condenser C1 triggers the output register 4. This latter one opens partly—as a local indicator—a light emitting diode LD1, partly it opens a transistor T2 of the driver stage 5. Into the collector circuit of the transistor T2 any optional intervening organ e.g. operating coil of a reed relay—can be inserted, however, the same point represents the enabling output **5*b* of the receiver, which is connected to the enabling input 8*a*** of the transmitter connected electrically thereto.

Figure 4:
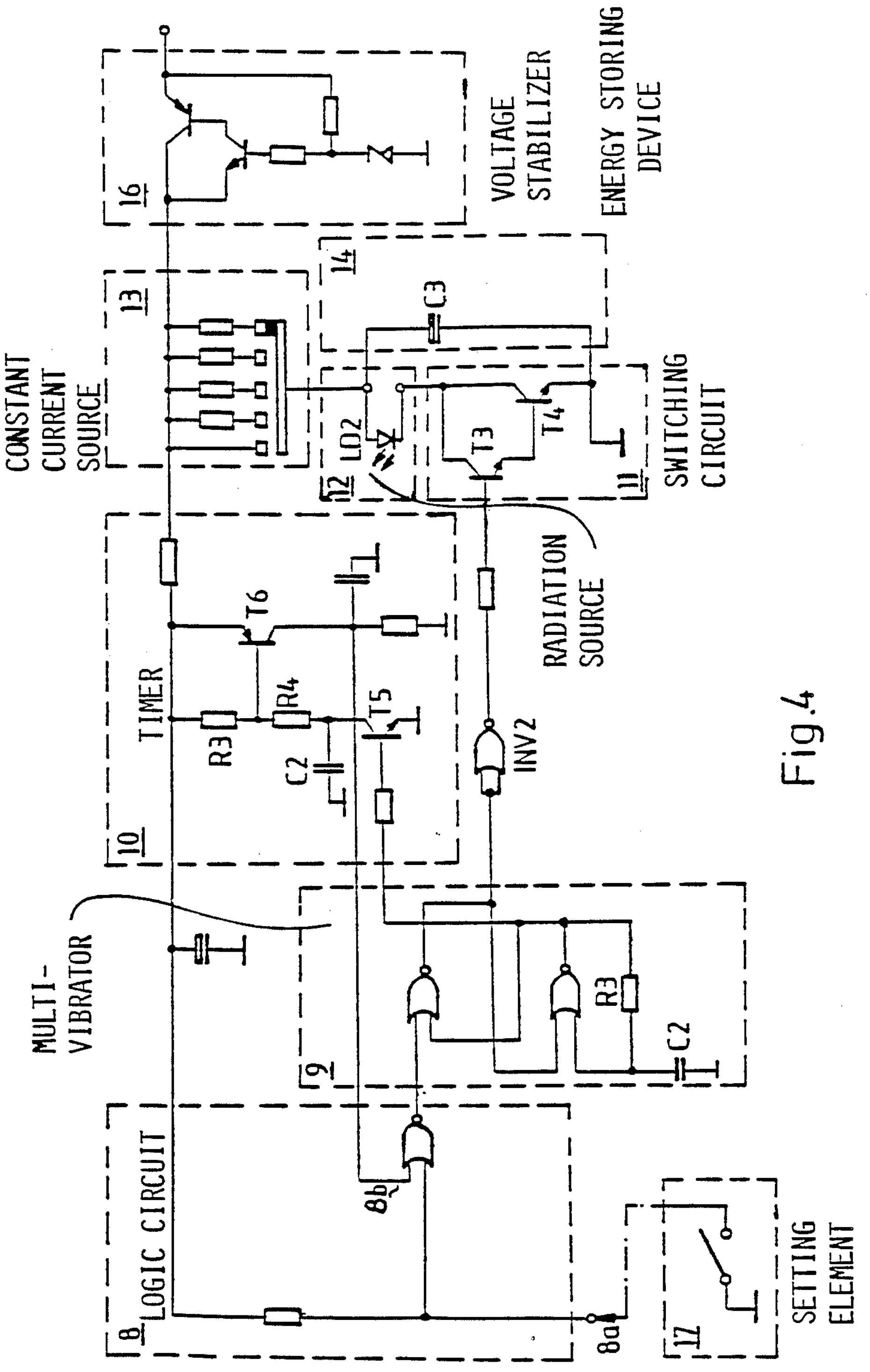
FIG. 4 is a more detailed diagram of the transmitter circuit according to FIG. 2.

As it becomes obvious from FIG. 4, the enabling input **8*a* of the transmitter circuit is connected to one of the inputs of a NAND gate of the logic circuit 8. The output of the NAND gate is led to the driving input of the astable multivibrator 9 built-up also with NAND gates, whereas the output 9*a* thereof is connected to the base of a transistor T5 of the timer 10. The transistor T5 serving as an integrator controls the switching transistor T6, the output of which is, led back to the enabling input 8*b* of the logic circuit 8. If on the enabling inputs 8*a*, 8*b* of the logic circuit 8 appears an adequate—in case of the present example a low—logic level, the NAND gate of the logic circuit 8 starts the astable multivibrator 9. This produces impulses with a frequency of approximately 100 Hz, and with a duty cycle of 1:1000, simultaneously it controls the output switching circuit 11 built-up with the transistors T3, T4 with its output signal via inverter INV2. The timing element/resistor R3—condenser C2/of the astable multivibrator 9** determining the space period does not load directly the input of the CMOS NAND gates, but the integrator with the transistor T5 and the switch realized with the transistor T6 forward the logical states being characteristic for the intervals to the input of the gates. In such a manner in course of operation either supply voltage or nearly ground potential are led to the input of the gates, as a consequence, total consumption will be extremely low during the impulse intervals. Although the elements resistor R3 condenser C2 defining the impulse, burden the NAND gate, however, in dependence of the duty cycle, it is realized but to the one thousandth of the duration of operation, so average consumption is not influenced decisively.

In order to achieve large range of action needed with infrared light barriers radiation source 12 of the transmitters is to be supplied with a great energy, which acts as a suddenly appearing considerable load in the supply of the transmitter. To avoid this phenomenon, the condenser C3 of the energy store 14 is charged continuously with a low current with the constant current source 13, while with the output switching circuit 11 a condenser C3 storing large energy is connected to the radiation source 12, in the present case to the infrared light emitting diode LD2, and the condenser C3 is discharged in an impulse-like manner on the light emitting diode LD2.

For the sake of simplicity the constant-current source 13 may contain a resistor of properly high value or even a plurality of resistors of different values, which can be optionally chosen, these are providing for the charge of the condenser C3 with a constant-current at the same time they prevent that the light-emitting diode LD2 connected to the condenser C3 by the output switching circuit 11 should act as a load for the battery 15. By this circuit arrangement it can be achieved, that the transmitter should emit impulses which can be evaluated even in a distance of 5–15 m, without separate optics, with an average current consumption of 1–2 mA.

Voltage stabilizers 7 and 16 of the transmitter and receiver, respectively, have an identical construction, in such a manner, it can be guaranteed that in case if the battery 6 resp. 15 dropped below a predetermined voltage level, the transmitter will be unable to emit light-impulses, which will be evaluated as an interrupt signal by the receiver staying in an optical connection therewith and as a consequence, an intervening signal will be released on its output.

It goes without saying that out of the transmitters and receivers-connected in a chain-of the optical alarm system the transmitter forming the first member of the chain is not always electrically connected to another receiver forming the last member of the chain. In this case the transmitter is to be rendered free-running. Setting element 17 to be seen in FIG. 4 serves just for this purpose, which may be a switch in the most simple case, by the aid of which the required logical level—in our case a low level—is switched to the enabling input 8*a* of the logical circuit 8.

Figure 5:
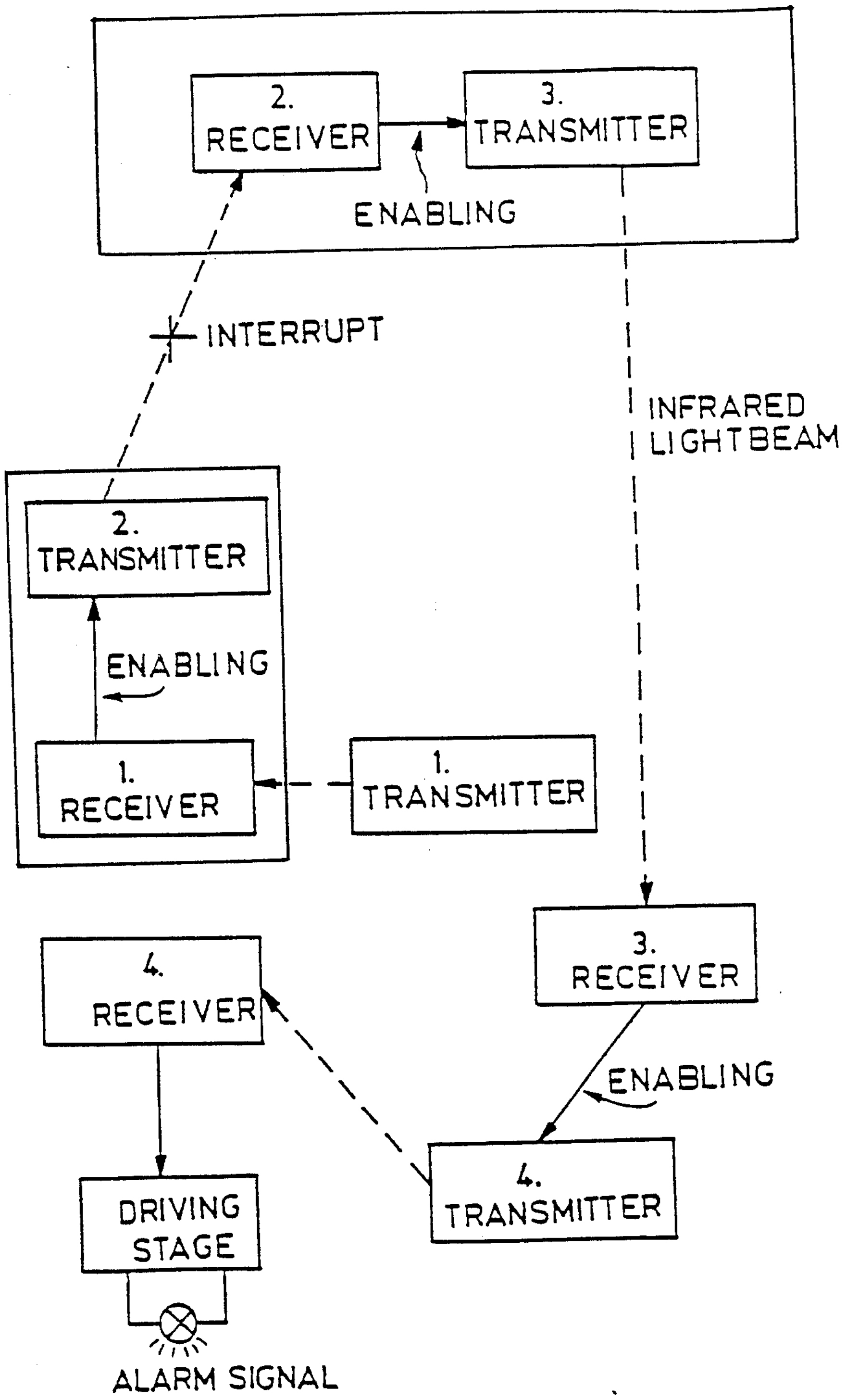
FIG. 5 shows a possible settlement of the alarm system.

FIG. 5 shows a possible settlement of the alarm system comprising four transmitters and four receivers. The transmitter and receiver do not build a closed loop, i.e. the enabling input of the first transmitter is not connected to the enabling output of the fourth receiver but is activated by the setting element 17. The power output of the fourth receiver is coupled to a driving stage operating a lamp for alarm signal.

The solid line quadrilaterals representing casings for the receivers, transmitters or combination receiver-transmitters of the system shown.

We claim:

1. Portable optical alarm system where more than one transmitter and associated receiver are used for area protection having at least one light-emitting pulse-mode transmitter having a transmitter circuit and at least one receiver, comprising a circuit and having an output, for sensing emitted light, as well as a driver stage connected to said output of one of said at least one receiver, wherein each transmitter and receiver are arranged in a separate casing containing said pulse-mode transmitter or receiver circuit with an associated battery as a power source and the output of said receiver is connected to an input of an additional transmitter in said system connected electrically thereto, while one of said at least one transmitters of said system is provided with a setting element activating an enabling input of the transmitter.

2. Portable optical alarm system for area protection as claimed in claim 1, wherein said transmitter circuit of said transmitter comprises a logic circuit, an astable multivibrator, a timer, an output switching circuit, an infrared radiation source, a constant-current source and energy storing device, wherein an enabling input of said transmitter circuit is connected to one of the inputs of a NAND gate of the logic circuit, an output of said timer is connected to another enabling input of the NAND gate of said logic circuit and the output of the latter one is connected to the driving input of the astable multivibrator, and the output thereof is led partly to an integrator of said timer, partly it is connected to one of the terminals of an infrared light emitting diode inserted as said radiation source through the transistor output switching circuit and the other terminal of said light emitting diode connected to a condenser of said energy storing device charged by said constant current source.

3. Portable optical alarm system for area protection as claimed in claim 1, wherein said receiver circuit of said receiver contains a light sensor, a wide-band, high-gain amplifier, connected thereto, an impulse drop-out detector formed as an integrator and connected to the output of said amplifier and output register and a transistor driver stage connected thereto, and a power output thereof is connected to an intervening organ of the system, while an enabling output is led to an enabling input of said transmitter staying in an electric connection therewith.

4. Portable optical alarm system for area protection as claimed in claim 1, wherein said transmitter circuit and said receiver circuit are each connected via a voltage stabilizer to said associated batteries.

5. A portable optical alarm system utilizing low energy consumption pulsed light transmitters and receivers, each powered by a battery, capable of sustained perimeter protection of a desired area comprising an initial light-emitting pulse mode transmitter, a terminal light pulse receiver and at least one receiver-transmitter combination placed between said initial light-emitting pulse mode transmitter and said terminal light pulse receiver wherein the receiver component of said receiver-transmitter combination must receive a light pulse from said initial light-emitting pulse mode transmitter, or another such transmitter, to enable the transmitter component of said receiver-transmitter combination to transmit.

6. A portable optical alarm system as claimed in claim 5, wherein said light transmitters transmit infrared light.

7. A portable optical alarm system as claimed in claim 6, wherein said at least one receiver-transmitter combination is adjustable with respect to the angle formed between the incoming light pulse received and the light pulse transmitted by said combination.

8. A portable optical alarm system as claimed in claim 5, wherein said terminal light pulse receiver is connected with an alarm, said alarm being triggered when no light pulse is received.

9. A portable optical alarm system as claimed in claim 8, wherein said receiver component of said receiver-transmitter combination displays a visual indicator when no light pulse is received.

10. A portable optical alarm system as claimed in claim 5, wherein said batteries are dry cells.

11. A portable optical alarm system as claimed in claim 5, wherein said initial light emitting pulse mode transmitter comprises a setting element enabling said initial light-emitting pulse mode transmitter to transmit light pulses.

12. A portable optical alarm system as claimed in claim 5, wherein said transmitters have circuitry, comprising a logic circuit, an astable multivibrator, a timer, an output switching circuit, an infrared radiation source, a constant current source, a voltage stabilizer, a dry cell battery, and an energy storing device, wherein an enabling input into said logic circuit is connected to a NAND gate of said logic circuit, an output of said timer is connected to another enabling input of said NAND gate, the output of said logic circuit is connected to a driving input of said astable multivibrator and said multivibrator has outputs connected to an integrator of said timer and to said switching circuit, said switching circuit being connected to said infrared radiation source and to said energy storing device, said energy storing device being charged by said constant current source, said constant current source being powered by said dry cell battery via said voltage stabilizer.

13. A portable optical alarm system as claimed in claim 12, wherein said transmitter is capable of emitting pulses discernable over a distance of 5 to 15 m, without additional optics, while consuming an average current of 1 to 2 mA.

14. A portable optical alarm system as claimed in claim 5, wherein said receivers have circuitry comprising a light sensor, a wide-band, high-gain amplifier connected to said light sensor, an impulse drop-out detector, formed as an integrator and connected to the output of said amplifier, an output register connected to said detector, a transistor driver stage connected to said output register, said transistor drive stage having a power output and an enabling output, said enabling output connected to a transmitter in the case of a receiver-transmitter combination and to a driving stage for an alarm in the case of a terminal receiver, a voltage stabilizer providing power to said receiver circuitry, and a battery powering said voltage stabilizer.

* * * * *